United States Patent
Sakurai et al.

(10) Patent No.: US 10,266,613 B2
(45) Date of Patent: Apr. 23, 2019

(54) CONJUGATED DIENE POLYMER AND METHOD OF PRODUCTION OF CONJUGATED DIENE POLYMER

(71) Applicant: ZEON CORPORATION, Tokyo (JP)

(72) Inventors: Takuro Sakurai, Chiyoda-ku (JP); Takashi Iizuka, Chiyoda-ku (JP); Hidenori Yamagishi, Chiyoda-ku (JP)

(73) Assignee: ZEON CORPORATION, Tokyo (JP)

( * ) Notice: Subject to any disclaimer, the term of this patent is extended or adjusted under 35 U.S.C. 154(b) by 169 days.

(21) Appl. No.: 15/108,152

(22) PCT Filed: Oct. 24, 2014

(86) PCT No.: PCT/JP2014/078315
§ 371 (c)(1),
(2) Date: Jun. 24, 2016

(87) PCT Pub. No.: WO2015/098264
PCT Pub. Date: Jul. 2, 2015

(65) Prior Publication Data
US 2016/0326274 A1  Nov. 10, 2016

(30) Foreign Application Priority Data

Dec. 27, 2013  (JP) ................. 2013-270889
Jun. 18, 2014  (JP) ................. 2014-125019

(51) Int. Cl.
| C08C 19/25 | (2006.01) |
| B60C 1/00 | (2006.01) |
| C08K 3/36 | (2006.01) |
| C08C 19/22 | (2006.01) |
| C08C 19/44 | (2006.01) |
| C08F 236/10 | (2006.01) |
| C08F 236/14 | (2006.01) |
| C08L 9/06 | (2006.01) |

(52) U.S. Cl.
CPC ............. *C08C 19/25* (2013.01); *B60C 1/00* (2013.01); *C08C 19/22* (2013.01); *C08C 19/44* (2013.01); *C08F 236/10* (2013.01); *C08F 236/14* (2013.01); *C08K 3/36* (2013.01); *C08L 9/06* (2013.01); *C08F 2800/20* (2013.01); *C08F 2810/20* (2013.01); *C08F 2810/40* (2013.01); *C08L 2201/08* (2013.01); *C08L 2205/025* (2013.01); *C08L 2312/02* (2013.01)

(58) Field of Classification Search
CPC ......... C08C 19/25; C08C 19/22; C08C 19/44; C08F 236/14; C08L 9/06; C08K 3/36
See application file for complete search history.

(56) References Cited

U.S. PATENT DOCUMENTS

| 5,001,196 A | 3/1991 | Kawanaka et al. |
| 2004/0176514 A1 | 9/2004 | Kubo et al. |
| 2004/0254301 A1 | 12/2004 | Tsukimawashi et al. |
| 2010/0099866 A1 | 4/2010 | Honma et al. |
| 2012/0006229 A1 | 1/2012 | Honma et al. |
| 2012/0149929 A1 | 6/2012 | Fukushima et al. |

FOREIGN PATENT DOCUMENTS

| JP | H01-249812 A | 10/1989 |
| JP | 2003-171418 A | 6/2003 |
| JP | 2009091498 A | 4/2009 |
| JP | 2009-256440 A | 11/2009 |
| JP | 2010-120925 A | 6/2010 |
| JP | 2011-006543 A | 1/2011 |

(Continued)

OTHER PUBLICATIONS

Dec. 9, 2014 International Search Report issued in International Patent Application No. PCT/JP2014/078315.

*Primary Examiner* — Peter D. Mulcahy
(74) *Attorney, Agent, or Firm* — Oliff PLC

(57) ABSTRACT

A conjugated diene polymer represented by the following formula (1) or the following formula (2):

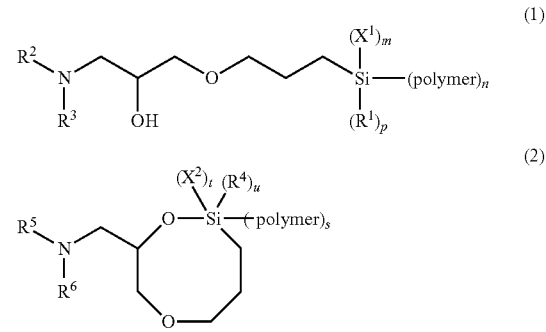

(wherein, in the formula (1) and in the formula (2), the "polymer" represents a polymer chain containing conjugated diene monomer units, $X^1$ and $X^2$ represent a functional group selected from a hydrocarbyloxy group, halogen group, and hydroxyl group, $R^1$ and $R^4$ represent a substituted or unsubstituted hydrocarbon group, $R^2$ and $R^3$ and $R^5$ and $R^6$ respectively represent a substituted or unsubstituted hydrocarbon group, $R^2$ and $R^3$ or $R^5$ and $R^6$ may bond with each other to form a ring structure. In the formula (1), "n" is an integer of 1 to 3, "m" is an integer of 0 to 2, "p" is an integer of 0 to 2, and n+m+p=3. Further, in the formula (2), "s" is 1 or 2, "t" is 0 or 1, "u" is 0 or 1, and s+t+u=2).

12 Claims, No Drawings

(56) References Cited

FOREIGN PATENT DOCUMENTS

| | | |
|---|---|---|
| JP | 2011-046640 A | 3/2011 |
| JP | 2011-079238 A | 4/2011 |
| JP | 2011-089029 A | 5/2011 |
| JP | 2011-094051 A | 5/2011 |
| JP | 2012-017291 A | 1/2012 |
| JP | 2014-208805 A | 11/2014 |
| WO | 03/091334 A1 | 11/2003 |
| WO | 2007/029497 A1 | 3/2007 |

CONJUGATED DIENE POLYMER AND METHOD OF PRODUCTION OF CONJUGATED DIENE POLYMER

TECHNICAL FIELD

The present invention relates to a conjugated diene polymer and to a method of production of a conjugated diene polymer, more particularly relates to a conjugated diene polymer able to give cross-linked rubber excellent in low heat buildup and wet grip and able to be suitably used for forming a low fuel consumption tire and to a method of production of the same.

BACKGROUND ART

In recent years, due to environmental issues and resource issues, strong demands have been placed on tires for automobile use for improving low fuel consumption. At the same time, excellent wet grip has been sought due to safety concerns. Cross-linked rubber obtained by using a composition containing silica as a filler are superior to cross-linked rubber obtained by using a composition containing carbon black in low heat buildup, so the rolling resistance when used for a tire becomes smaller. For this reason, by using cross-linked rubber obtained by using a composition containing silica to make tires, it is possible to obtain tires excellent in low fuel consumption.

However, even if adding silica to conventional rubber, the affinity of rubber and silica is insufficient, so these easily separate. Due to this, the processability of the rubber composition before cross-linking is poor. Further, the cross-linked rubber obtained by cross-linking this becomes insufficient in low heat buildup.

Therefore, to improve the affinity of rubber and silica, for example, it has been proposed to add various silane coupling agents such as disclosed in Patent Document 1, and Patent Document 2 to the rubber composition. However, advanced processing techniques are required for handling silane coupling agents and silane coupling agents are expensive, so if the amounts added become greater, there is the problem that tires will become higher in manufacturing costs.

To solve this problem, for example, as disclosed in Patent Document 3, Patent Document 4, etc., when using the solution polymerization method to obtain a rubber polymer, the technique of causing a modifying agent to react with the active end of a polymer so as to impart affinity with silica to the rubber itself has been studied. However, due to the growing demand for low fuel consumption and wet grip on automobile tires in recent years, rubber able to give cross-linked rubber further excellent in low heat buildup and excellent in wet grip has been demanded.

PRIOR ART DOCUMENTS

Patent Documents

Patent Document 1: Japanese Patent Publication No. 2011-46640A
Patent Document 2: Japanese Patent Publication No. 2012-17291A
Patent Document 3: Japanese Patent Publication No. 1-249812A
Patent Document 4: Japanese Patent Publication No. 2003-171418A

SUMMARY OF THE INVENTION

Problem to be Solved by the Invention

Therefore, the present invention has as its object the provision of a conjugated diene polymer able to give cross-linked rubber excellent in low heat buildup and wet grip and a method of production of the same.

Means for Solving the Problems

The inventors engaged in intensive research to achieve the above object and as a result discovered that by causing, as a modifying agent, a compound having a 1,6-dioxa-2-silacyclooctane structure where an 8-position is substituted by a tertiary amine structure-containing group to react with a conjugated diene polymer chain having an active end so as to introduce a group having a specific structure at an end of the conjugated diene polymer, a conjugated diene polymer able to give a cross-linked rubber excellent in low heat buildup and wet grip can be obtained. The present invention was completed based on this discovery.

Therefore, according to the present invention, there is provided a conjugated diene polymer represented by the following formula (1) or the following formula (2):

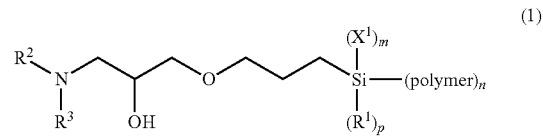

(wherein, in the formula (1), the "polymer" represents a polymer chain containing conjugated diene monomer units, $X^1$ represents a functional group selected from a hydrocarbyloxy group, halogen group, and hydroxyl group, $R^1$ represents a substituted or unsubstituted hydrocarbon group, $R^2$ and $R^3$ respectively represent a substituted or unsubstituted hydrocarbon group, $R^2$ and $R^3$ may bond with each other to form a ring structure, "n" is an integer of 1 to 3, "m" is an integer of 0 to 2, "p" is an integer of 0 to 2, and n+m+p=3.)

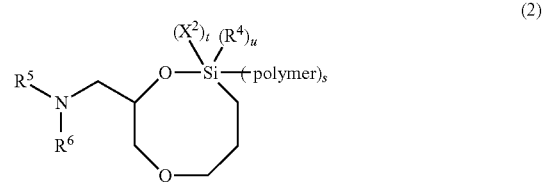

(wherein, in the formula (2), the "polymer" represents a polymer chain containing conjugated diene monomer units, $X^2$ represents a functional group selected from a hydrocarbyloxy group, halogen group, and hydroxyl group, $R^4$ represents a substituted or unsubstituted hydrocarbon group, $R^5$ and $R^6$ respectively represent a substituted or unsubstituted hydrocarbon group, $R^5$ and $R^6$ may bond with each other to form a ring structure, "s" is 1 or 2, "t" is 0 or 1, "u" is 0 or 1, and s+t+u=2.)

The conjugated diene polymer of the present invention preferably further comprises, in addition to a conjugated diene polymer represented by the formula (1) or the formula (2), a conjugated diene polymer represented by the formula (3) and/or a conjugated diene polymer represented by the formula (4):

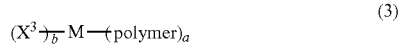

(wherein, in the formula (3), "polymer" represents a polymer chain containing conjugated diene monomer units, $X^3$ represents a halogen group or hydroxyl group, M represents a silicon atom or tin atom, "a" is an integer of 1 to 4, "b" is an integer of 0 to 3, and a+b=4.)

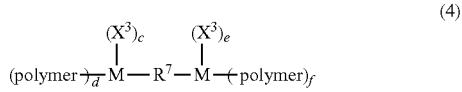

(wherein, in the formula (4), "polymer" represents a polymer chain containing conjugated diene monomer units, $X^3$ represents a halogen group or hydroxyl group, $R^7$ represents a substituted or unsubstituted hydrocarbon group, M represents a silicon atom or tin atom, "c" is an integer of 0 to 3, "d" is an integer of 0 to 3, "e" is an integer of 0 to 3, "f" is an integer of 0 to 3, c+d=3, e+f=3, and d+f is an integer of 1 to 6.)

Further, according to the present invention, there is provided a rubber composition comprising 100 parts by weight of a rubber ingredient containing the above conjugated diene polymer, and 10 to 200 parts by weight of silica.

The rubber composition preferably further comprises a cross-linking agent.

Further, according to the present invention, there is provided a cross-linked rubber obtained by cross-linking the above rubber composition.

Further, according to the present invention, there is provided a tire comprising the above cross-linked rubber.

Further, according to the present invention, there is provided a method of production of a conjugated diene polymer comprising a step of polymerizing a monomer containing a conjugated diene compound in an inert solvent using a polymerization initiator so as to obtain a conjugated diene polymer chain having an active end and a step of reacting a compound represented by the following formula (5) with the active end of the conjugated diene polymer chain having an active end:

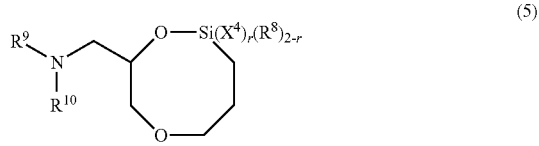

(wherein, in the formula (5), $X^4$ represents a functional group selected from a hydrocarbyloxy group, halogen group, and hydroxyl group, $R^8$ represents a substituted or unsubstituted hydrocarbon group, $R^9$ and $R^{10}$ respectively represent a substituted or unsubstituted hydrocarbon group, $R^9$ and $R^{10}$ may bond with each other to form a ring structure, and "r" is an integer of 0 to 2.)

The method of production of the conjugated diene polymer of the present invention preferably further comprises, after obtaining the conjugated diene polymer chain having an active end, a step of reacting part of the active ends of the conjugated diene polymer chains with a tin halide, silicon halide, or compound represented by the following formula (6):

(wherein, in the formula (6), $R^{11}$ represents a substituted or unsubstituted alkyl chain, $X^5$ expresses a halogen group, and M expresses a silicon atom or tin atom.)

Effects of the Invention

According to the present invention, it is possible to provide a conjugated diene polymer able to give cross-linked rubber excellent in low heat buildup and wet grip and a method of production of the same.

DESCRIPTION OF EMBODIMENTS

The conjugated diene polymer of the present invention is represented by the following formula (1) or the following formula (2). The conjugated diene polymer of the present invention may be one comprising only polymer chain represented by the following formula (1) or one comprising only polymer chain represented by the following formula (2) or may be a mixture of polymer chain represented by the following formula (1) and polymer chain represented by the following formula (2).

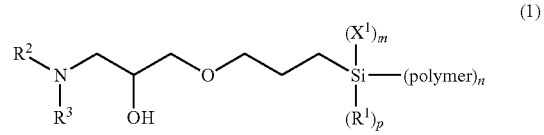

In the formula (1), the "polymer" represents a polymer chain containing conjugated diene monomer units, $X^1$ represents a functional group selected from a hydrocarbyloxy group, halogen group, and hydroxyl group, $R^1$ represents a substituted or unsubstituted hydrocarbon group, $R^2$ and $R^3$ respectively represent a substituted or unsubstituted hydrocarbon group, $R^2$ and $R^3$ may bond with each other to form a ring structure, "n" is an integer of 1 to 3, "m" is an integer of 0 to 2, "p" is an integer of 0 to 2, and n+m+p=3.

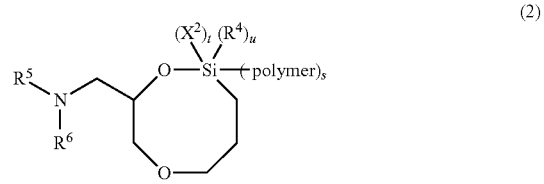

In the formula (2), the "polymer" represents a polymer chain containing conjugated diene monomer units, $X^2$ represents a functional group selected from a hydrocarbyloxy group, halogen group, and hydroxyl group, $R^4$ represents a substituted or unsubstituted hydrocarbon group, $R^5$ and $R^6$ respectively represent a substituted or unsubstituted hydrocarbon group, $R^5$ and $R^6$ may bond with each other to form a ring structure, "s" is 1 or 2, "t" is 0 or 1, "u" is 0 or 1, and s+t+u=2.

In the formula (1) and the formula (2), the polymer chain represented by "polymer" is a polymer chain including conjugated diene monomer units. The conjugated diene compound used as the monomer for forming the conjugated diene monomer units is not particularly limited, but 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene, etc. may be mentioned. Among these as well, 1,3-butadiene and/or isoprene are preferable. These conjugated diene compounds may be used as single type alone or may be used as two types or more combined.

In the formula (1) and the formula (2), the polymer chain represented by the "polymer" may be one composed of only conjugated diene monomer units, but may also be one further containing units composed of a compound which can copolymerize with conjugated diene compound. As the compound which can copolymerize with conjugated diene compound, for example, aromatic vinyl compounds such as styrene, methylstyrene, ethylstyrene, t-butylstyrene, α-methylstyrene, α-methyl-p-methylstyrene, chlorostyrene, bromostyrene, methoxystyrene, dimethylamino methylstyrene, dimethylamino ethylstyrene, diethylamino methylstyrene, diethylamino ethylstyrene, cyano ethylstyrene, and vinylnaphthalene; chain olefin compounds such as ethylene, propylene and 1-butene; cyclic olefin compounds such as cyclopentene and 2-norbornene; unconjugated diene compounds such as 1,5-hexadiene, 1,6-heptadiene, 1,7-octadiene, dicyclopentadiene, and 5-ethylidene-2-norbornene; (meth)acrylic acid esters such as methyl (meth)acrylate, ethyl (meth)acrylate and butyl (meth)acrylate; (meth)acrylic acid derivatives other than the above such as (meth)acrylonitrile and (meth)acrylamide; etc. may be mentioned. Among these as well, aromatic vinyl compounds are preferable. Among these, particularly styrene is preferable. These compounds which can copolymerize with conjugated diene compound may be used as single type alone or as two or more types combined.

In the formula (1) and the formula (2), in the polymer chain represented by "polymer", the ratio of the conjugated diene monomer units to all monomer units forming the polymer chain is not particularly limited, but is usually 30 wt % or more, preferably 40 wt % or more, more preferably 50 wt % or more. Further, the content of the vinyl bonds (1,2-vinyl bond and 3,4-vinyl bond) at the conjugated diene monomer unit part of the polymer chain is not particularly limited, but is usually 1 to 90 mol %, preferably 5 to 85 mol %, more preferably 10 to 80 mol %. Further, in this polymer chain, the ratio of the aromatic vinyl monomer units to all monomer units forming the polymer chain is not particularly limited, but is usually 70 wt % or less, preferably 60 wt % or less, more preferably 50 wt % or less. Further, in this polymer chain, the ratio of the monomer units other than the conjugated diene monomer units and aromatic vinyl monomer units with respect to all monomer units forming the polymer chain is not particularly limited, but is usually 20 wt % or less, preferably 10 wt % or less, more preferably 5 wt % or less.

In the formula (1) and the formula (2), when the polymer chain represented by the "polymer" is comprised of two or more types of monomer units, the type of bond may, for example, be made various types of bonds such as a block type, taper type, and random type, but a random bond type is preferable. By making it a random type, the obtained cross-linked rubber becomes more excellent in low heat buildup. Further, in the polymer chain represented by the "polymer" in the formula (1) and the formula (2), an end at the side bonded with a silicon atom represented by "Si" in the formula (1) and the formula (2) may also be comprised of a polymer block comprised of substantially only isoprene units. When such end is comprised of a polymer block comprised of substantially only isoprene units, the obtained conjugated diene polymer and silica become excellent in affinity and the obtained cross-linked rubber becomes more excellent in low heat buildup and abrasion resistance.

In the formula (1), "n" (that is, in the formula (1), the number of polymer chains bonded with a silicon atom represented by "Si") is an integer of 1 to 3. The conjugated diene polymer of the present invention may be one comprising only polymer in which "n" in the formula (1) are specific numerical values or may be one comprising a mixture of polymer in which "n" in the formula (1) are different values.

Further, in the formula (2), "s" (that is, the number of polymer chains bonded with the a silicon atom represented by "Si" in the formula (2)) is 1 or 2. The conjugated diene polymer of the present invention may be one comprising only polymer in which "s" in the formula (2) are specific numerical values or may be one comprising a mixture of chains in which "s" in the formula (2) are different values.

In the formula (1) and the formula (2), $X^1$ and $X^2$ represent a functional group selected from a hydrocarbyloxy group, halogen group, and hydroxyl group. The hydrocarbyloxy group which may form the functional group represented by $X^1$ and $X^2$ is not particularly limited, but an alkoxy group such as a methoxy group, ethoxy group, n-propoxy group, isopropoxy group, n-butoxy group, isobutoxy group, sec-butoxy group, and tert-butoxy group; an alkenyloxy group such as a vinyloxy group and allyloxy group; an aryloxy group such as a phenoxy group and naphthoxy group; an aralkyloxy group such a benzyloxy group; etc. may be mentioned. Among these as well, an alkoxy group or aryloxy group is preferable, an alkoxy group is more preferable, and a methoxy group or ethoxy group is particularly preferable. Further, the halogen group which may form $X^1$ and $X^2$ are not particularly limited, but a fluoro group, chloro group, bromo group, or iodo group may be mentioned. Among these as well, a chloro group is preferable. Further, $X^1$ and $X^2$ may be a hydroxyl group. Such a hydroxyl group may be a hydroxyl group obtained by hydrolyzing a hydrocarbyloxy group or halogen group.

Note that, in the formula (1) and the formula (2), when containing the alkoxy group as $X^1$ and $X^2$ (that is, when containing an alkoxysilyl group), the alkoxy group can be converted to a hydroxyl group by hydrolysis by various types of reactions (that is, can be converted to a silanol group).

In the formula (1), "m" (that is, the number of functional groups represented by $X^1$ in the formula (1)) is an integer of 0 to 2, preferably 1 or 2. The conjugated diene polymer of the present invention may be one comprising only polymer in which "m" in the formula (1) are specific numerical values or may be one comprising a mixture of polymer in which "m" in the formula (1) are different values. Further, when "m" is 2, the two functional groups represented by $X^1$ in the formula (1) contained in one molecule of the conjugated diene polymer may be the same or may be different from each other.

Further, in the formula (2), "t" (that is, the number of functional groups represented by $X^2$ in the formula (2)) is 0 or 1. The conjugated diene polymer of the present invention may be one comprising only polymer in which "t" in the formula (2) are specific numerical values or may be one comprising a mixture of polymer in which "t" in the formula (2) are different values.

In the formula (1) and in the formula (2), $R^1$ and $R^4$ represent a substituted or unsubstituted hydrocarbon group. The hydrocarbon group which may form $R^1$ and $R^4$ is not particularly limited, but an alkyl group such as a methyl group, ethyl group, n-propyl group, isopropyl group, n-butyl group, isobutyl group, sec-butyl group, and tert-butyl group; an alkenyl group such as a vinyl group and allyl group; an alkynyl group such as an ethynyl group and propynyl group; an aryl group such as a phenyl group and naphthyl group; an aralkyl group such as a benzyl group; etc. may be mentioned. Among these as well, an alkyl group or aryl group is preferable, and an alkyl group is more preferable. Further, the hydrocarbon group represented by $R^1$ and $R^4$ may have a substituent other than a hydrocarbon group. The substituent is not particularly limited, but a carbonyl-group containing group such as a carboxyl group, acid anhydride group, hydrocarbylcarbonyl group, alkoxycarbonyl group, and acyloxy group or an epoxy group, oxy group, cyano group, amino group, halogen group, etc. may be mentioned.

In the formula (1), "p" (that is, the number of groups represented by $R^1$ in the formula (1)) is an integer of 0 to 2, preferably 0 or 1. The conjugated diene polymer of the present invention may be one comprising only polymer in which "p" in the formula (1) are specific numerical values or may be one comprising a mixture of polymer in which "p" in the formula (1) are different values. Further, when "p" is 2, the two groups represented by $R^1$ in formula (1) contained in one molecule of the conjugated diene polymer may be the same or may be different from each other.

Further, in the formula (2), "u" (that is, the number of groups represented by $R^4$ in the formula (2)) is 0 or 1. The conjugated diene polymer of the present invention may be one comprising only polymer in which "u" in the formula (2) are specific numerical values or may be one comprising a mixture of polymer in which "u" in the formula (2) are different values.

In the formula (1) and the formula (2), $R^2$, $R^3$, $R^5$ and $R^6$ respectively represent a substituted or unsubstituted hydrocarbon group. $R^2$ and $R^3$ may bond with each other to form a ring structure together with the nitrogen atom represented by "N" in the formula (1). Similarly, $R^5$ and $R^6$ may bond with each other to form a ring structure together with the nitrogen atom represented by "N" in the formula (2). When $R^2$ and $R^3$, $R^5$ and $R^6$ do not bond with each other, the functional group which may form $R^2$, $R^3$, $R^5$ and $R^6$ are not particularly limited, but an alkyl group such as a methyl group, ethyl group, n-propyl group, isopropyl group, n-butyl group, isobutyl group, sec-butyl group, and tert-butyl group; an alkenyl group such as a vinyl group and allyl group; an alkynyl group such as an ethynyl group and propynyl group; an aryl group such as a phenyl group and naphthyl group; an aralkyl group such as a benzyl group; etc. may be mentioned. Among these as well, an alkyl group or aryl group is preferable, an alkyl group is more preferable, and a methyl group or ethyl group is particularly preferable. Further, when $R^2$ and $R^3$ or $R^5$ and $R^6$ bond together to form a ring structure, the divalent hydrocarbon group comprised of $R^2$ and $R^3$ bonded together or the divalent hydrocarbon group comprised of $R^5$ and $R^6$ bonded together is not particularly limited, but a n-butylene group (when forming a 1-pyrrolidone group together with the nitrogen atom represented by "N" in the formula (1) or the formula (2)), n-pentylene group (when forming a 1-piperidine group), butadienylene group (when forming a 1-pyrrole group), etc. may be mentioned.

Further, the hydrocarbon group represented by $R^2$, $R^3$, $R^5$ and $R^6$ may have a substituent other than the hydrocarbon group regardless of whether forming ring structures. The substituent is not particularly limited, but a carbonyl-group containing group such as a carboxyl group, acid anhydride group, hydrocarbylcarbonyl group, alkoxycarbonyl group, and acyloxy group or an epoxy group, oxy group, cyano group, amino group, halogen group, etc. may be mentioned. Furthermore, when the $R^2$ and $R^3$ or the $R^5$ and $R^6$ bond together to form a ring structure, as the atom forming the ring structure, atom other than the carbon atom and nitrogen atom represented by "N" in the formula (1) or the formula (2) may be included. As examples of such atom, nitrogen atom or oxygen atom may be mentioned.

In the formula (1), n+m+p=3. That is, in the formula (1), the sum of "n", "m", and "p" is 3.

Further, in the formula (2), s+t+u=2. That is, in the formula (2), the sum of "s", "t", and "u" is 2.

As the conjugated diene polymer of the present invention, as particularly preferable one, one where the hydrocarbon groups represented by $R^2$ and $R^3$ and by $R^5$ and $R^6$ bond with each other to form piperadine ring structures together with the nitrogen atoms represented by "N" in formula (1) and formula (2) may be mentioned. More specifically, the conjugated diene polymer of the present invention is particularly preferably a conjugated diene polymer represented by the following formula (7) or the following formula (8). By the conjugated diene polymer of the present invention having such a structure, the obtained cross-linked rubber can be made particularly excellent in low heat buildup.

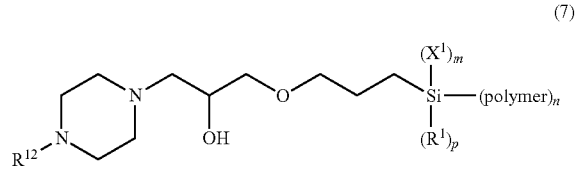

(7)

In the formula (7), the "polymer", $X^1$, $R^1$, "n", "m", and "p" all represent the same as in the formula (1), $R^{12}$ represents a hydrocarbon group, and n+m+p=3.

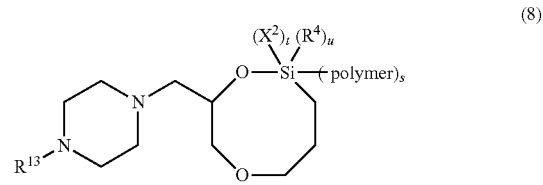

(8)

In the formula (8), the "polymer", $X^2$, $R^4$, "s", "t", and "u" all represent the same as in the formula (2), $R^{13}$ represents a hydrocarbon group, and s+t+u=2.

In the formula (7) and the formula (8), $R^{12}$ and $R^{13}$ represent a hydrocarbon group. The hydrocarbon group which may form $R^{12}$ and $R^{13}$ is not particularly limited, but an alkyl group such as a methyl group, ethyl group, n-propyl group, isopropyl group, n-butyl group, isobutyl group, sec-butyl group, and tert-butyl group; an alkenyl group such as a vinyl group and allyl group; an alkynyl group such as an ethynyl group and propynyl group; an aryl group such as a phenyl group and naphthyl group; an aralkyl group such as a benzyl group; etc. may be mentioned. Among these as well, an alkyl group or aryl group is preferable, an alkyl group is more preferable, and a methyl group is particularly preferable.

The weight average molecular weight (Mw) of the conjugated diene polymer of the present invention is not particularly limited, but the value measured by gel permeation chromatography converted to polystyrene is normally 1,000 to 3,000,000, preferably 10,000 to 2,000,000, more preferably 100,000 to 1,500,000 in range. By making the weight average molecular weight of the conjugated diene polymer the above range, the processability and mechanical strength of the conjugated diene polymer become better balanced.

Further, the molecular weight distribution represented by the ratio (Mw/Mn) of the weight average molecular weight (Mw) and the number average molecular weight (Mn) of the conjugated diene polymer of the present invention is not particularly limited, but is preferably 1.0 to 5.0, more preferably 1.0 to 3.0. By making the molecular weight distribution of the conjugated diene polymer the above range, the obtained cross-linked rubber becomes more excellent in low heat buildup.

The conjugated diene polymer of the present invention can be suitably used for various applications by adding compounding ingredient such as a filler and cross-linking agent. Particularly, when adding a filler comprised of silica, a rubber composition which is suitable for use for obtaining cross-linked rubber able to give cross-linked rubber excellent in low heat buildup and wet grip is given.

The method of production of such a conjugated diene polymer of the present invention is not particularly limited so long as the targeted structure is obtained, but the method of production of the conjugated diene polymer of the present invention explained next is suitable. That is, the method of production of the conjugated diene polymer of the present invention comprises a step of polymerizing a monomer containing a conjugated diene compound in an inert solvent using a polymerization initiator so as to obtain a conjugated diene polymer chain having an active end and a step of reacting a compound represented by the following formula (5) with the active end of the conjugated diene polymer chain having an active end.

One of the two essential steps in the method of production of the conjugated diene polymer of the present invention is a step of polymerizing a monomer containing a conjugated diene compound in an inert solvent using a polymerization initiator so as to obtain a conjugated diene polymer chain having an active end.

As the conjugated diene compound used as the monomer to obtain a conjugated diene polymer having an active end in this step, the same as those illustrated as conjugated diene compound used for forming the polymer chain containing conjugated diene monomer units in the conjugated diene polymer of the present invention explained above may be illustrated.

Further, as the monomer, an aromatic vinyl compound may be used together with the conjugated diene compound. As the aromatic vinyl compound used as a monomer, the same as those illustrated as aromatic vinyl compounds used for forming the polymer chain containing conjugated diene monomer units in the conjugated diene polymer of the present invention explained above may be illustrated. Furthermore, as the monomer, along with the conjugated diene compound, it is possible to use a compound able to copolymerize with the conjugated diene compound other than an aromatic vinyl compound. As the compound able to copolymerize with the conjugated diene compound other than the aromatic vinyl compound used as a monomer, the same as those illustrated as compounds able to copolymerize with the conjugated diene compound and able to be used for forming the polymer chain containing conjugated diene monomer units in the conjugated diene polymer of the present invention explained above excluding the aromatic vinyl compound may be illustrated.

The inert solvent used for the polymerization is not particularly limited so long as solvent usually used in solution polymerization and not detracting from the polymerization reaction. As specific examples of the inert solvent, chain aliphatic hydrocarbons such as butane, pentane, hexane, and heptane; alicyclic hydrocarbons such as cyclopentane and cyclohexane; aromatic hydrocarbons such as benzene, toluene, and xylene; etc. may be mentioned. These inert solvents may be used as single type alone or as two or more types combined. The amount of the inert solvent is not particularly limited, but an amount in which the monomer concentration becomes, for example, 1 to 50 wt %, preferably 10 to 40 wt %.

The polymerization initiator used for polymerization is not particularly limited so long as able to cause a monomer containing a conjugated diene compound to polymerize to give conjugated diene polymer chain having an active end. As specific example, an organic alkali metal compound, organic alkali earth metal compound, and a polymerization initiator having a lanthanum-series metal compound, etc. as a primary catalyst may be mentioned. As the organic alkali metal compound, for example, organic monolithium compounds such as n-butyllithium, sec-butyllithium, t-butyllithium, hexyllithium, phenyllithium, and stilbenelithium; organic polyvalent lithium compounds such as dilithiomethane, 1,4-dilithiobutane, 1,4-dilithio-2-ethylcyclohexane, 1,3,5-trilithiobenzene, and 1,3,5-tris-lithiomethyl)benzene; organic sodium compounds such as sodium naphthalene; organic potassium compounds such as potassium naphthalene; etc. may be mentioned. Further, as the organic alkali earth metal compound, for example, di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diketylbarium, etc. may be mentioned. As the polymerization initiator having a lanthanum-series metal compound as a primary catalyst, for example, a polymerization initiator having a salt of a lanthanum-series metal comprised of a lanthanum series metal such as lanthanum, cerium, praseodymium, neodymium, samarium, and gadolinium and a carboxylic acid, phosphorus-containing organic acid, etc. as a primary catalyst and comprised of this and a co-catalyst such as an alkylaluminum compound, organic aluminum halide compound, and organic aluminum halide compound, etc. may be mentioned. Among these polymerization initiators, organic monolithium compound and organic polyvalent lithium compound are preferably used, an organic monolithium compound is more preferably used, and n-butyllithium is particularly preferably used. Note that, the organic alkali metal compound may be reacted in advance with a secondary amine such as dibutylamine, dihexylamine, dibenzylamine, pyrrolidone, hexamethylene imine, and heptamethylene imine and be used as an organic alkali metal amide compound. These polymerization initiators may be used as single type alone or as two or more types combined.

The amount of use of the polymerization initiator may be determined in accordance with the targeted molecular weight of the conjugated diene polymer chain, but is usually 1 to 50 moles per 1000 g of the monomer, preferably 1.5 to 20 moles, more preferably 2 to 15 moles in range.

The polymerization temperature is usually −80 to +150° C., preferably 0 to 100° C., more preferably 30 to 90° C. in range. As the polymerization process, a batch process, continuous process, or any other process can be employed, but when copolymerizing a conjugated diene compound and aromatic vinyl compound, the batch process is preferable in the point of facilitating control of the randomness of bonds between the conjugated diene monomer units and aromatic vinyl monomer units. Note that, as explained above, in the polymer chain represented by the "polymer" in the formula (1) and the formula (2), when an end at the side bonded with a silicon atom represented by "Si" in the formula (1) and the formula (2) are formed by a polymer block comprised of substantially only isoprene units, the polymerization process may be made the batch process and, first, the monomer for forming parts other than the polymer block comprised of only isoprene units may be polymerized, then a monomer comprised of only isoprene may be added to the polymerization reaction system for polymerization before adding the compound represented by the formula (5) to the polymerization reaction system.

Further, in polymerization of a monomer including a conjugated diene compound, to adjust the vinyl bond content in the conjugated diene monomer units in the obtained conjugated diene polymer chain, it is preferable to add a polar compound to the inert organic solvent. As the polar compound, for example, ether compounds such as dibutylether and tetrahydrofuran; tertiary amines such as tetramethylethylene diamine; alkali metal alkoxides; phosphine compounds; etc. may be mentioned. Among these as well, an ether compound and a tertiary amine are preferable, a tertiary amine is more preferable, and tetramethylethylene diamine is particularly preferable. These polar compounds may be used as single type alone or as two or more types combined. The amount of use of the polar compound may be determined according to the targeted vinyl bond content and is preferably 0.001 to 100 moles with respect to 1 mole of the polymerization initiator, more preferably 0.01 to 10 moles. If the amount of use of the polar compound is in this range, adjustment of the vinyl bond content in the conjugated diene monomer units is easy and the problem of deactivation of the polymerization initiator hardly ever arises.

According to the above such process, it is possible to obtain a conjugated diene polymer chain having an active end in an inert solvent. The remaining one of the two essential steps in the method of production of the conjugated diene polymer of the present invention is the step of making the compound represented by the below formula (5) react with an active end of this conjugated diene polymer chain.

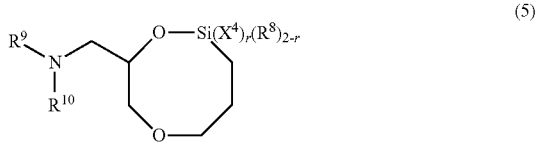

(5)

In the formula (5), $X^4$ represents a functional group selected from a hydrocarbyloxy group, halogen group, and hydroxyl group, $R^8$ represents a substituted or unsubstituted hydrocarbon group, $R^9$ and $R^{10}$ respectively represent a substituted or unsubstituted hydrocarbon group, $R^9$ and $R^{10}$ may be bonded with each other to form a ring structure, and "r" is an integer of 0 to 2.

In the formula (5), $X^4$ represents a functional group selected from a hydrocarbyloxy group, halogen group, and hydroxyl group. As specific examples of the functional group which may form the functional group represented by $X^4$, the same as those illustrated as functional groups which may form $X^1$ and $X^2$ in the formula (1) and in the formula (2) may be mentioned.

In the formula (5), "r" (that is, the number of groups represented by $X^4$ in the formula (5)) is an integer of 0 to 2. If the "r" in the formula (5) is 2, the two groups represented by $X^4$ in the formula (5) which are contained in one molecule of the compound represented by the formula (5) may be the same or may be different from each other.

In the formula (5), $R^8$ represents a substituted or unsubstituted hydrocarbon group. As specific examples of the hydrocarbon group in the substituted or unsubstituted hydrocarbon group represented by $R^8$ and its substituent, the same as those illustrated in the substituted or unsubstituted hydrocarbon group which may form $R^1$ and $R^4$ in the formula (1) and the formula (2) may be mentioned. If "r" in the formula (5) is 0, the two groups represented by $R^8$ in the formula (5) which are contained in one molecule of the compound represented by the formula (5) may be the same or may be different from each other.

In the formula (5), $R^9$ and $R^{10}$ respectively represent a substituted or unsubstituted hydrocarbon group, while $R^9$ and $R^{10}$ may bond with each other to form a ring structure. As specific examples of the hydrocarbon group in the substituted or unsubstituted hydrocarbon group represented by $R^9$ and $R^{10}$ and its substituent, it is possible to mention the same as those illustrated for the substituted or unsubstituted hydrocarbon group which may form $R^2$ and $R^3$ and $R^5$ and $R^6$ in the formula (1) and the formula (2).

To obtain the conjugated diene polymers represented by the formula (7) and the formula (8) particularly preferable as the conjugated diene polymer of the present invention, it is sufficient to use a compound represented by the following formula (9) as the compound represented by the formula (5).

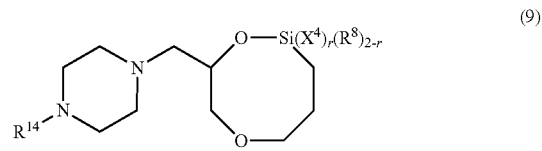

(9)

In the formula (9), $X^4$, $R^8$, and "r" all represent the same as those in the formula (5), while $R^{14}$ represents a hydrocarbon group.

In the formula (9), $R^{14}$ represents a hydrocarbon group. The hydrocarbon group which may form $R^{14}$ is not particularly limited, but an alkyl group such as a methyl group, ethyl group, n-propyl group, isopropyl group, n-butyl group, isobutyl group, sec-butyl group, and tert-butyl group; an alkenyl group such as a vinyl group and allyl group; an alkynyl group such as an ethynyl group and propynyl group; an aryl group such as a phenyl group and naphthyl group; an aralkyl group such as a benzyl group; etc. may be mentioned. Among these as well, an alkyl group or aryl group is preferable, an alkyl group is more preferable, and a methyl group is particularly preferable.

As specific examples of the compound represented by the formula (5), 2,2-dimethoxy-8-(4-methylpiperadinyl)methyl- 1,6-dioxa-2-silacyclooctane, 2,2-diethoxy-8-(4-methylpiperadinyl)methyl-1,6-dioxa-2-silacyclooctane, 2,2-dimethoxy-8-(N,N-diethyl)methyl-1,6-dioxa-2-silacyclooctane, 2-methoxy-2-methyl-8-(4-methylpiperadinyl)methyl-1,6-dioxa-2-silacyclooc tane etc. may be mentioned. The compounds represented by the formula (5) may be used as single type alone or as two or more types combined.

In the method of production of the conjugated diene polymer of the present invention, the amount of use of the compound represented by the formula (5) is not particularly limited, but as the amount of the compound represented by the formula (5) with respect to 1 mole of active end of the conjugated diene polymer chain having an active end to be reacted with, 0.5 to 10.0 moles is preferable, 0.7 to 5.0 moles is more preferable, and 1.0 to 2.0 moles is particularly preferable. By using the compound represented by the formula (5) in such an amount, the obtained conjugated diene polymer can become one giving cross-linked rubber particularly excellent in low heat buildup.

Note that, usually, the compound represented by the formula (5) is considered to proceed in reaction in the following way when reacted with an active end of a conjugated diene polymer chain. That is, first, illustrating the first reaction mode, as a first stage reaction, the oxygen-silicon bond in the 8-member ring structure in the compound represented by the formula (5) is cleaved, the silicon atom forms a new bond with an active end of the conjugated diene polymer chain, and the oxygen atom forms a salt structure with the counter ions of the active end (note that, the salt structure will react with the proton derived from the polymerization reaction terminator etc. at the time of stopping the polymerization reaction to form a hydroxyl group). Furthermore, when the compound represented by the formula (5) has a hydrocarbyloxysilyl group (when "r" in the formula (5) is 1 or 2), the hydrocarbyloxy group of the hydrocarbyloxysilyl group and an active end of the conjugated diene polymer chain react and, furthermore, a bond is formed between the silicon atom and an active end of the conjugated diene polymer chain.

Alternatively, as the second reaction mode, $X^4$ bonded to the silicon atom eliminates without the oxygen-silicon bond being cleaved in the 8-member ring structure in the compound represented by the formula (5) in the first stage reaction, whereby the silicon atom forms a new bond with an active end of the conjugated diene polymer chain, and the oxygen atom forms a salt structure with the counter ion of the active end (note that, the salt structure will react with the proton derived from the polymerization reactor terminator etc. at the time of stopping the polymerization reaction to form a hydroxyl group). Furthermore, when the compound represented by the formula (5) has a hydrocarbyloxysilyl group (when "r" in the formula (5) is 1 or 2), the hydrocarbyloxy group in the hydrocarbyloxysilyl group and an active end of the conjugated diene polymer chain react and, furthermore, a bond is formed between the silicon atom and an active end of the conjugated diene polymer chain.

In the present invention, by the reaction proceeding by the first reaction mode, the conjugated diene polymer represented by the formula (1) can be obtained. On the other hand, by the reaction proceeding by the second reaction mode, the conjugated diene polymer represented by the formula (2) can be obtained. Further, by the reaction by the first reaction mode and the reaction by the second reaction mode simultaneously proceeding (for example, when the reaction mainly proceeds by the first reaction mode, while the reaction secondarily proceeds by the second reaction mode etc.), a mixture of a conjugated diene polymer represented by the formula (1) and a conjugated diene polymer represented by the formula (2) can be obtained.

The method of making the compound represented by the formula (5) react with the conjugated diene polymer chain having an active end is not particularly limited, but the method of mixing these in a solvent able to dissolve the same etc. may be mentioned. As the solvent used at this time, the same as those illustrated as inert solvents used in the above polymerization etc. can be used. Further, at this time, the method of adding the compound represented by the formula (5) to the polymerization solution used for the polymerization for obtaining conjugated diene polymer chain having an active end is simple and preferable. Further, at this time, the compound represented by the formula (5) is preferably dissolved in an inert solvent and then added to the polymerization system. The solution concentration is preferably 1 to 50 wt % in range. The reaction temperature is not particularly limited, but is usually 0 to 120° C. The reaction time is also not particularly limited, but is usually 1 minute to 1 hour.

The timing for adding the compound represented by the formula (5) to the solution containing the conjugated diene polymer chain having an active end is not particularly limited, but it is preferable to add the compound represented by the formula (5) to this solution in the state where the polymerization reaction is not completed and the solution containing the conjugated diene polymer chain having an active end also contains a monomer, more specifically, in the state where the solution containing conjugated diene polymer chain having an active end contains 100 ppm or more of monomer, more preferably 300 to 50,000 ppm of monomer. By adding the compound represented by the formula (5) in this way, it becomes possible to suppress secondary reactions between the conjugated diene polymer chain having an active end and impurities etc. contained in the polymerization system and to control the reaction well.

Note that, when in the state before making the compound represented by the formula (5) react with conjugated diene polymer chain having an active end or when in the state where conjugated diene polymer chain having an active end remain after the reaction, a conventionally normally used coupling agent or modifying agent etc. may be added to the polymerization system for coupling or modificating part of the active end of the conjugated diene polymer chain having an active end within a range not impairing the effect of the present invention.

Particularly, in the present invention, it is preferable to react part of the active ends of the conjugated diene polymer chains having an active end with a coupling agent comprised of tin halide, silicon halide, or a compound represented by the following formula (6).

(6)

In the formula (6), $R^{11}$ represents a substituted or unsubstituted alkyl chain, $X^5$ represents a halogen group, and M represents a silicon atom or tin atom.

As the tin halide, tin tetrachloride, triphenylmonochlorotin, etc. may be mentioned, but tin tetrachloride is preferable. Further, as the silicon halide, silicon tetrachloride, hexachlorodisilane, triphenoxychlorosilane, methyltriphenoxysilane, diphenoxydichlorosilane, etc. may be mentioned, while silicon tetrachloride is preferable.

Further, in the formula (6), $R^{11}$ represents a substituted or unsubstituted hydrocarbon group. The hydrocarbon group which may form $R^{11}$ is not particularly limited, but a methylene group, 1,2-ethylene group, 1,3-propylene group, 1,4-butylene group, 1,5-pentylene group, 1,6-hexylene group, 4-methyl-2,2-pentylene group, 2,3-dimethyl-2,3-butylene group, etc. may be mentioned. Among these as well, a 1,2-ethylene group and 1,6-hexylene group are preferable. Further, the halogen group which may form $X^5$ is not particularly limited, but a fluoro group, chloro group, bromo group, and iodo group may be mentioned. Among these as well, a chloro group is preferable. Furthermore, "M" is a silicon atom or tin atom, but a silicon atom is preferable.

Further, as specific examples of the compound represented by the formula (6), bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, 1,6-bis(trichlorosilyl)hexane, etc. may be mentioned.

In the method of production of the conjugated diene polymer of the present invention, the amount of use of tin halide, silicon halide, or the compound represented by the formula (6) is not particularly limited, but as the amount with respect to 1 mole of the active end of the conjugated diene polymer chain having an active end, 0.001 to 0.2 mole is preferable, 0.005 to 0.1 mole is more preferable, and 0.01 to 0.05 mole is particularly preferable. By using tin halide, silicon halide, or the compound represented by the formula (6) in such an amount, it is possible to improve the shape stability of the obtained conjugated diene polymer more.

In the present invention, by making tin halide, silicon halide, or the compound represented by the formula (6) as a coupling agent react with part of the active ends of the conjugated diene polymer chains having an active end in this way, the conjugated diene polymer of the present invention can be made a mixture of the conjugated diene polymer represented by the formula (1) or the formula (2) and the conjugated diene polymer represented by the the formula (3) and/or the conjugated diene polymer represented by the formula (4) (conjugated diene polymer composition). Further, due to this, it is possible to introduce a branched structure (preferably, a branched structure of three or more branches) into the conjugated diene polymer and as a result possible to make the conjugated diene polymer one excellent in shape stability (that is, one which, when processed into a predetermined shape (for example, bale shape), can maintain this predetermined shape well).

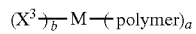 (3)

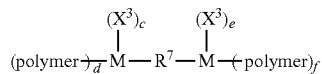 (4)

Note that, in the formula (3), the "polymer" represents a polymer chain containing conjugated diene monomer units, $X^3$ represents a halogen group or hydroxyl group, M represents a silicon atom or tin atom, "a" is an integer of 1 to 4, "b" is an integer of 0 to 3, and a+b=4.

In the formula (3), the polymer chain represented by the "polymer" is a polymer chain containing conjugated diene monomer units and is similar to those in the formula (1) and the formula (2). Further, $X^3$ represents a halogen group or hydroxyl group. The halogen group which may form $X^3$ is not particularly limited, but a fluoro group, chloro group, bromo group, and iodo group may be mentioned. Among these as well, a chloro group is preferable.

Further, in the formula (4), the "polymer" represents a polymer chain containing conjugated diene monomer units, $X^3$ represents a halogen group or hydroxyl group, $R^7$ represents a substituted or unsubstituted hydrocarbon group, M represents a silicon atom or tin atom, "c" is an integer of 0 to 3, "d" is an integer of 0 to 3, "e" is an integer of 0 to 3, "f" is an integer of 0 to 3, c+d=3, e+f=3, and d+f is an integer of 1 to 6.

The polymer chain represented by the "polymer" in the formula (4) is a polymer chain containing conjugated diene monomer units and is similar to those in the formula (1) and the formula (2). Further, $X^3$ represents a halogen group or hydroxyl group. The halogen group which may form $X^3$ is not particularly limited, but a fluoro group, chloro group, bromo group, or iodo group can be mentioned. Among these as well, a chloro group is preferable. Furthermore, $R^7$ represents a substituted or unsubstituted hydrocarbon group. As the hydrocarbon group which may form $R^7$, there are ones similar to those in the formula (6).

Note that, when making the conjugated diene polymer of the present invention a mixture of a conjugated diene polymer represented by the formula (1) or the formula (2) and a conjugated diene polymer represented by the formula (3) and/or the conjugated diene polymer represented by the formula (4), the ratio of these is preferably 60:40 to 98:2 in terms of the weight ratio of the (conjugated diene polymer represented by the formula (1) or the formula (2)): (conjugated diene polymer represented by the formula (3) and/or conjugated diene polymer represented by the formula (4)), more preferably 80:20 to 96:4. By making the ratio of these the above range, the effect of improvement of the shape stability can be more suitably obtained.

The conjugated diene polymer of the present invention is not particularly limited in coupling rate, but is preferably 10 wt % or more, more preferably 15 wt % or more, particularly preferably 20 wt % or more, further preferably 80 wt % or less, more preferably 75 wt % or less, particularly preferably 70 wt % or less. If this coupling rate is too low, the cross-linked product obtained from the conjugated diene polymer is liable to become insufficient in mechanical strength. Further, if the coupling rate is too high, the cross-linked product obtained from the conjugated diene polymer is liable to become insufficient in abrasion resistance. Note that, the coupling rate is the weight percentage of the polymer molecules having a molecular weight of 1.8 times or more of the peak top molecular weight of the conjugated diene polymer chain having an active end before reaction with the compound represented by the formula (5) and coupling agent (specifically, tin halide, silicon halide, or compound represented by the formula (6)) or other modifying agent to the total amount of the finally obtained conjugated diene polymer. The molecular weight at this time is measured by finding the molecular weight converted to polystyrene by gel permeation chromatography.

If unreacted active end remain after making the compound represented by the formula (5) and, if desired, a coupling agent (specifically, tin halide, silicon halide, or compound represented by the formula (6)) or other modifying agent react with the conjugated diene polymer chain having an active end, an alcohol such as methanol, ethanol, and isopropanol or water as a polymerization terminator is preferably added to the polymerization solution to deactivate the unreacted active end.

To the solution of the thus obtained conjugated diene polymer, an antiaging agent such as a phenol-based stabilizing agent, phosphorus-based stabilizing agent, and sulfur-based stabilizing agent may be added, if desired. The amount of addition of the antiaging agent may be suitably determined in accordance with the type etc. Furthermore, if desired, an oil extender may be mixed in to obtain oil extended rubber. As the oil extender, for example, a paraffin-based, aromatic-based, and naphthene-based oil-based softening agent, plant-based softening agent, fatty acid, etc. may be mentioned. When using the oil-based softening agent, the content of the polycyclic aromatic compound extracted by the method of IP346 (test method of THE INSTITUTE PETROLEUM of the U.K.) is preferably less than 3%. When using an oil extender, the amount of use is usually 5 to 100 parts by weight with respect to 100 parts by weight of the conjugated diene polymer.

Further, the thus obtained conjugated diene polymer can be obtained as a solid type conjugated diene polymer by, for example, steam stripping to remove the solvent and thereby separate the polymer from the reaction mixture. Note that, when the conjugated diene polymer obtained by the polymerization reaction has a hydrocarbyloxy group or halogen group as the group represented by $X^1$ and $X^2$ in the formula (1) and the formula (2), when steam stripping this conjugated diene polymer, at least part of these groups may be hydrolyzed to produce a hydroxyl group, but a conjugated diene polymer having a hydroxyl group (silanol group) as the group represented by $X^1$ and $X^2$ produced in this way can also be used as the conjugated diene polymer of the present invention.

The rubber composition of the present invention is a rubber composition containing, for example, the 100 parts by weight of rubber ingredients containing thus obtained conjugated diene polymer of the present invention and 10 to 200 parts by weight of silica.

As the silica used in the present invention, for example, dry white carbon, wet white carbon, colloidal silica, precipitated silica, etc. may be mentioned. Among these as well, wet white carbon mainly comprised of hydrous silicic acid is preferable. Further, a carbon-silica dual phase filler comprised of carbon black on the surface of which silica is carried may be used. These silicas can be used respectively independently or as two or more types combined. The nitrogen adsorption specific surface area of the silica which is used (measured by BET method based on ASTM D3037-81) is preferably 50 to 300 m$^2$/g, more preferably 80 to 220 m$^2$/g, particularly preferably 100 to 170 m$^2$/g. Further, the pH of the silica is preferably 5 to 10.

The amount of silica in the rubber composition of the present invention is 10 to 200 parts by weight with respect to 100 parts by weight of the rubber ingredients in the rubber composition, preferably 30 to 150 parts by weight, more preferably 50 to 100 parts by weight. By making the amount of the silica this range, the processability of the rubber composition becomes excellent and the obtained cross-linked rubber becomes more excellent in abrasion resistance and low heat buildup.

The rubber composition of the present invention may further contain a silane coupling agent from the viewpoint of further improvement of low heat buildup. As the silane coupling agent, for example, vinyltriethoxysilane, β-(3,4-epoxycyclohexyl)ethyltrimethoxysilane, N-(β-aminoethyl)-γ-aminopropyltrimethoxysilane, 3-octathio-1-propyl-triethoxysilane, bis(3-(triethoxysilyl)propyl) disulfide, bis(3-(triethoxysilyl)propyl) tetrasulfide, γ-trimethoxysilylpropyldimethylthiocarbamyl tetrasulfide, γ-trimethoxysilylpropylbenzothiazyl tetrasulfide, etc. may be mentioned. These silane coupling agents can be used respectively independently or as two or more types combined. The amount of the silane coupling agent is preferably 0.1 to 30 parts by weight with respect to 100 parts by weight of the silica in the rubber composition, more preferably 1 to 15 parts by weight.

Further, the rubber composition of the present invention may further contain carbon black such as furnace black, acetylene black, thermal black, channel black, and graphite. Among these as well, furnace black is preferable. These carbon blacks can be used respectively independently or as two or more types combined. The amount of the carbon black is usually 120 parts by weight or less with respect to 100 parts by weight of the rubber ingredients in the rubber composition.

The method of adding silica to the rubber ingredients including the conjugated diene polymer of the present invention is not particularly limited, but the method of adding it to and kneading it with the solid rubber ingredients (dry kneading method), the method of adding it to a solution of the rubber ingredients and coagulating and drying them (wet kneading method), etc. may be applied.

Further, the rubber composition of the present invention preferably further contains a cross-linking agent. As the cross-linking agent, for example, a sulfur-containing compound such as sulfur and halogenated sulfur, an organic peroxide, quinone dioximes, organic polyvalent amine compound, an alkylphenol resin having a methylol group, etc. may be mentioned. Among these as well, sulfur is preferably used. The amount of the cross-linking agent is preferably 0.1 to 15 parts by weight with respect to 100 parts by weight of the rubber ingredients in the rubber composition, more preferably 0.5 to 5 parts by weight, particularly preferably 1 to 4 parts by weight.

Further, the rubber composition of the present invention may have mixed with it, other than the above ingredients, in accordance with ordinary methods, compounding ingredients such as a cross-linking accelerator, cross-linking activator, antiaging agent, filler (except the above-mentioned silica and carbon black), activating agent, process oil, plasticizer, slip agent, and tackifier in respectively required amounts.

When using sulfur or a sulfur-containing compound as a cross-linking agent, jointly using a cross-linking accelerator and cross-linking activator is preferable. As the cross-linking accelerator, for example, a sulfenamide-based cross-linking accelerator; guanidine-based cross-linking accelerator; thiourea-based cross-linking accelerator; thiazole-based cross-linking accelerator; thiuram-based cross-linking accelerator; dithiocarbamic acid-based cross-linking accelerator; xanthic acid-based cross-linking accelerator; etc. may be mentioned. Among these as well, one including a sulfenamide-based cross-linking accelerator is preferable. These cross-linking accelerators may be used respectively alone or as two or more types combined. The amount of cross-linking accelerator is preferably 0.1 to 15 parts by weight with respect to 100 parts by weight of the rubber ingredients in the rubber composition, more preferably 0.5 to 5 parts by weight, particularly preferably 1 to 4 parts by weight.

As the cross-linking activator, for example, higher fatty acids such as stearic acid; zinc oxide; etc. may be mentioned. These cross-linking activators may be used respectively alone or as two types or more combined. The amount of the cross-linking activator is preferably 0.05 to 20 parts by weight with respect to 100 parts by weight of the rubber ingredients in the rubber composition, particularly preferably 0.5 to 15 parts by weight.

Further, the rubber composition of the present invention may contain other rubber besides the conjugated diene polymer of the present invention. As the other rubber, for example, other rubber than the above-mentioned conjugated diene rubber such as natural rubber, polyisoprene rubber, emulsion polymerized styrene-butadiene copolymer rubber, solution polymerized styrene-butadiene copolymer rubber, polybutadiene rubber (high cis-BR or low cis BR. Further, polybutadiene rubber containing crystal fibers made of 1,2-polybutadiene polymer also possible), styrene-isoprene copolymer rubber, butadiene-isoprene copolymer rubber, styrene-isoprene-butadiene copolymer rubber, acrylonitrile-butadiene copolymer rubber, and acrylonitrile-styrene-butadiene copolymer rubber may be mentioned. Among these as well, natural rubber, polyisoprene rubber, polybutadiene rubber, and solution polymerized styrene-butadiene copolymer rubber are preferable. These rubbers can be used respectively independently or as two or more types combined.

In the rubber composition of the present invention, the conjugated diene polymer of the present invention preferably accounts for 10 to 100 wt % of the rubber ingredients in the rubber composition, particularly preferably accounts for 50 to 100 wt %. In such a case, by the conjugated diene polymer of the present invention being included in the rubber ingredients, cross-linked rubber more excellent in low heat buildup and abrasion resistance can be obtained.

To obtain the rubber composition of the present invention, it is sufficient to knead the ingredients according to an ordinary method. For example, it is possible to knead the ingredients other than thermally unstable ingredients such as cross-linking agent and cross-linking accelerator with the rubber ingredients, then mix thermally unstable ingredients such as cross-linking agent and cross-linking accelerator with the kneaded material to obtain the target rubber composition. The kneading temperature of the ingredients other than the thermally unstable ingredients and the rubber ingredients is preferably 80 to 00° C., more preferably 120 to 180° C., while the kneading time is preferably 30 seconds to 30 minutes. Further, the kneaded material and thermally unstable ingredients are mixed after cooling them down to usually 100° C. or less, preferably 80° C. or less.

The cross-linked rubber of the present invention is obtained by cross-linking the rubber composition of the present invention such as explained above. The cross-linked rubber of the present invention may be produced using the rubber composition of the present invention, for example, shaping it by a forming machine corresponding to the desired shape, for example, an extruder, injection molding machine, press, rolls, etc., and heating it for a cross-linking reaction to fix the shape as a cross-linked product. In this case, the product may be cross-linked after shaping it in advance or may be cross-linked simultaneous with shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 12 hours, particularly preferably 3 minutes to 6 hours.

Further, depending on the shape, size, etc. of cross-linked rubber, sometimes even if the surface is cross-linked, the inside is not sufficiently cross-linked, so the cross-linked rubber may be further heated for secondary cross-linking.

As the heating method for cross-linking the rubber composition, it is sufficient to suitably select press heating, steam heating, oven heating, hot air heating, and other general methods used for cross-linking rubber.

For example, the cross-linked rubber of the present invention obtained in the above way is obtained using the conjugated diene polymer of the present invention, so is excellent in low heat buildup and wet grip. The cross-linked rubber of the present invention, making use of these characteristics, can for example, be used for materials for parts of tires such as cap treads, base treads, carcasses, side walls, and bead parts; materials of industrial products such as hoses, belts, mats, and vibration absorbing rubber; agents for improving the impact resistance of resins; resin film buffer agents; shoe soles; rubber shoes; golf balls; toys; and other various applications. In particular, the cross-linked rubber of the present invention is excellent in low heat buildup and wet grip, so can be suitably used as the material for a tire, particularly as the material for a low fuel consumption tire. It is optimal for a tread application. That is, the tire of the present invention is a tire comprising the cross-linked rubber of the present invention.

EXAMPLES

Below, examples and comparative examples will be given to more specifically explain the present invention. Note that, in the examples, "parts" and "%" are based on weight unless particularly represented otherwise.

The various measurements and evaluation were performed by the following methods.

[Molecular Weight of Conjugated Diene Polymer]

The molecular weight of the polymer was found by gel permeation chromatography as the molecular weight converted to polystyrene. The specific measurement conditions were as follows:

Measurement device: High pressure liquid chromatograph (made by Toso, product name "HLC-8220")

Column: made by Toso, product name "GMH—HR—H", two connected in series.

Detector: Differential refractometer

Eluent: tetrahydrofuran

Column temperature: 40° C.

[Coupling Rate of Conjugated Diene Polymer]

In an elution curve obtained by a gel permeation chromatography under the above conditions, the area ratio of peak parts having a peak top molecular weight of 1.8 times or more of the peak top molecular weight shown by a peak of the smallest molecular weight to the total elution area was made the value of the coupling rate of the conjugated diene polymer.

[Shape Stability of Conjugated Diene Polymer]

The conjugated diene polymer is formed into a thickness 2 mm sheet shape, then was punched to a dumbbell no. 8 shape prescribed by JIS K6251. At the center part of this dumbbell shaped test piece, two mark lines were drawn to give a distance between mark lines of 10 mm. Next, one of the grip parts of the test piece was fixed and the piece hung down. This was allowed to stand at a temperature 23° C. and humidity 50% for 96 hours. The distance between the mark lines was found after standing and was used as the value of the shape stability. This value of the shape stability was shown indexed to the measured value of Comparative Example 1 as 100. The smaller this index, the better the shape stability.

[Low Heat Buildup of Cross-Linked Rubber]

The low heat buildup was evaluated by measuring a test piece of a length 50 mm, width 12.7 mm, and thickness 2 for the value of tan δ at 60° C. using an ARES made by Rheometrics under conditions of a dynamic stress of 2.5% and 10 Hz. The value of this tan δ was shown indexed to the measured value of Comparative Example 1 as 100. The smaller this index, the better the low heat buildup.

[Wet Grip of Cross-Linked Rubber]

The wet grip was evaluated by measuring a test piece of a length 50 mm, width 12.7 mm, and thickness 2 mm for the value of tan δ at 0° C. using an ARES made by Rheometrics under conditions of a dynamic stress of 0.5% and 10 Hz. The value of this tan δ was shown indexed to the measured value of Comparative Example 1 as 100. The larger this index, the better the wet grip.

Example 1

In a nitrogen atmosphere, an autoclave was charged with 800 parts of cyclohexane, 94.8 parts of 1,3-butadiene, 25.2 parts of styrene, and 0.164 part of tetramethylethylene diamine, then 0.045 part of n-butyllithium was added and polymerization started at 60° C. The polymerization reaction was continued for 60 minutes. It was confirmed that the polymerization conversion rate was from 95% to 100% in range, then 0.322 part of 2,2-dimethoxy-8-(4-methylpiperadinyl)methyl-1,6-dioxa-2-silacyclooctane was added and the reaction performed for 30 minutes, then 0.064 part of methanol as a polymerization terminator was added to obtain a solution containing a conjugated diene polymer. Further, with respect to 100 parts of the obtained polymer ingredients, 0.15 part of 2,4-bis[(octylthio)methyl]-o-cresol (made by Ciba Specialty Chemicals, product name "Irganox 1520") as an antiaging agent was added to the solution, then steam stripping was performed to remove the solvent and remainder was dried in vacuo at 60° C. for 24 hours to obtain a solid conjugated diene polymer. The obtained conjugated diene polymer of Example 1 had a weight average molecular weight (Mw) of 370,000, a molecular weight distribution (Mw/Mn) of 1.29, and a coupling rate of 32.8%. Further, the obtained conjugated diene polymer of Example 1 was evaluated by the above method for shape stability, whereupon the index of the shape stability (value when indexed to the results of Comparative Example 1 as 100. Below, same in examples and comparative examples) was 26.

Example 2

In a nitrogen atmosphere, an autoclave was charged with 800 parts of cyclohexane, 94.8 parts of 1,3-butadiene, 25.2 parts of styrene, and 0.164 part of tetramethylethylene diamine, then 0.045 part of n-butyllithium was added and polymerization started at 60° C. The polymerization reaction was continued for 60 minutes. It was confirmed that the polymerization conversion rate was from 95% to 100% in range, then 0.0055 part of tin tetrachloride was added and the reaction performed for 10 minutes. Next, 0.263 part of 2,2-dimethoxy-8-(4-methylpiperadinyl)methyl-1,6-dioxa-2-silacyclooctane was added and the reaction performed for 30 minutes, then 0.064 part of methanol as a polymerization terminator was added to obtain a solution containing a conjugated diene polymer. Further, with respect to 100 parts of the obtained polymer ingredients, 0.15 part of 2,4-bis[(octylthio)methyl]-o-cresol (made by Ciba Specialty Chemicals, product name "Irganox 1520") as an antiaging agent was added to the solution, then steam stripping was performed to remove the solvent and remainder was dried in vacuo at 60° C. for 24 hours to obtain a solid conjugated diene polymer. The obtained conjugated diene polymer of Example 2 had a weight average molecular weight (Mw) of 328,000, a molecular weight distribution (Mw/Mn) of 1.43, and a coupling rate of 40.0%. Further, the obtained conjugated diene polymer of Example 2 was evaluated for shape stability in accordance with the above method, whereby the index value of the shape stability was 15.

Example 3

Except for using, instead of 0.0055 part of tin tetrachloride, 0.0036 part of silicon tetrachloride, the same procedure was followed as in Example 2 to obtain a solid shape conjugated diene polymer. The obtained conjugated diene polymer of Example 3 had a weight average molecular weight (Mw) of 340,000, a molecular weight distribution (Mw/Mn) of 1.41, and a coupling rate of 43.9%. Further, the obtained conjugated diene polymer of Example 3 was evaluated for shape stability in accordance with the above method, whereby the index value of the shape stability was 9.

Example 4

Except for using, instead of 0.0055 part of tin tetrachloride, 0.0075 part of 1,6-bis(trichlorosilyl)hexane, the same procedure was followed as in Example 2 to obtain a solid shape conjugated diene polymer. The obtained conjugated diene polymer of Example 4 had a weight average molecular weight (Mw) of 333,000, a molecular weight distribution (Mw/Mn) of 1.44, and a coupling rate of 42.1%. Further, the obtained conjugated diene polymer of Example 4 was evaluated for shape stability in accordance with the above method, whereby the index value of the shape stability was 12.

Example 5

Except for using, instead of 0.0055 part of tin tetrachloride, 0.0063 part of 1,2-bis(trichlorosilyl)ethane, the same procedure was followed as in Example 2 to obtain a solid shape conjugated diene polymer. The obtained conjugated diene polymer of Example 5 had a weight average molecular weight (Mw) of 338,000, a molecular weight distribution (Mw/Mn) of 1.46, and a coupling rate of 41.3%. Further, the obtained conjugated diene polymer of Example 5 was evaluated for shape stability in accordance with the above method, whereby the index value of the shape stability was 12.

Example 6

Except for using, instead of 0.322 part of 2,2-dimethoxy-8-(4-methylpiperadinyl)methyl-1,6-dioxa-2-silacyclooctane, 0.352 part of 2,2-diethoxy-8-(4-methylpiperadinyl)methyl-1,6-dioxa-2-silacyclooctane, the same procedure was followed as in Example 1 to obtain a solid shape conjugated diene polymer. The obtained conjugated diene polymer of Example 6 had a weight average molecular weight (Mw) of 285,000, a molecular weight distribution (Mw/Mn) of 1.20, and a coupling rate of 19.1%. Further, the obtained conjugated diene polymer of Example 6 was evaluated for shape stability in accordance with the above method, whereby the index value of the shape stability was 71.

Example 7

Except for using, instead of 0.263 part of 2-dimethoxy-8-(4-methylpiperadinyl)methyl-1,6-dioxa-2-silacyclooctane, 0.310 part of 2-diethoxy-8-(4-methylpiperadinyl) methyl-1,6-dioxa-2-silacyclooctane, the same procedure was followed as in Example 2 to obtain a solid shape conjugated diene polymer. The obtained conjugated diene polymer of Example 7 had a weight average molecular weight (Mw) of 298,000, a molecular weight distribution (Mw/Mn) of 1.30, and a coupling rate of 24.0%. Further, the obtained conjugated diene polymer of Example 7 was evaluated for shape stability in accordance with the above method, whereby the index value of the shape stability was 52.

Example 8

Except for using, instead of 0.322 part of 2,2-dimethoxy-8-(4-methylpiperadinyl)methyl-1,6-dioxa-2-silacyclooctane, 0.294 part of 2,2-dimethoxy-8-(N,N-diethyl)methyl-1,6-dioxa-2-silacyclooctane, the same procedure was followed as in Example 1 to obtain a solid shape conjugated diene polymer. The obtained conjugated diene polymer of Example 8 had a weight average molecular weight (Mw) of 292,000, a molecular weight distribution (Mw/Mn) of 1.51, and a coupling rate of 43.0%. Further, the obtained conjugated diene polymer of Example 8 was evaluated for shape stability in accordance with the above method, whereby the index value of the shape stability was 13.

Example 9

Except for using, instead of 0.263 part of 2-dimethoxy-8-(4-methylpiperadinyl)methyl-1,6-dioxa-2-silacyclooctane, 0.165 part of 2,2-dimethoxy-8-(N,N-diethyl)methyl-1,6-dioxa-2-silacyclooctane, the same procedure was followed as in Example 2 to obtain a solid shape conjugated diene polymer. The obtained conjugated diene polymer of Example 9 had a weight average molecular weight (Mw) of 345,000, a molecular weight distribution (Mw/Mn) of 1.45, and a coupling rate of 45.5%. Further, the obtained conjugated diene polymer of Example 9 was evaluated for shape stability in accordance with the above method, whereby the index value of the shape stability was 5.

Comparative Example 1

Except for using, instead of 0.322 part of 2,2-dimethoxy-8-(4-methylpiperadinyl)methyl-1,6-dioxa-2-silacyclooctane, 0.236 part of 2,2-dimethoxy-1-phenyl-1-aza-2-silacyclopentane, the same procedure was followed as in Example 1 to obtain a solid shape conjugated diene polymer. The obtained conjugated diene polymer of Comparative Example 1 had a weight average molecular weight (Mw) of 258,000, a molecular weight distribution (Mw/Mn) of 1.12, and a coupling rate of 4.5%. Further, the obtained conjugated diene polymer of Comparative Example 1 was evaluated for shape stability in accordance with the above method, whereby the index value of the shape stability was 100.

Comparative Example 2

Except for using, instead of 0.322 part of 2,2-dimethoxy-8-(4-methylpiperadinyl)methyl-1,6-dioxa-2-silacyclooctane, 0.188 part of N-phenyl-2-pyrrolidone, the same procedure was followed as in Example 1 to obtain a solid shape conjugated diene polymer. The obtained conjugated diene polymer of Comparative Example 2 had a weight average molecular weight (Mw) of 255,000, a molecular weight distribution (Mw/Mn) of 1.08, and a coupling rate of 2.2%. Further, the obtained conjugated diene polymer of Comparative Example 2 was evaluated for shape stability in accordance with the above method, whereby the index value of the shape stability was 100.

[Production and Evaluation of Cross-Linked Rubber]

In a volume 250 ml Brabender type mixer, 100 parts of the conjugated diene polymer of Example 1 were masticated for 30 seconds, next 50 parts of silica (made by Rhodia, product name "Zeosil 1115MP"), 20 parts of process oil (made by Nippon Oil Corporation, product name "Aromax T-DAE"), and 6.0 parts of the silane coupling agent bis(3-(triethoxysilyl)propyl)tetrasulfide (made by Degussa, product name "Si69") were added and kneaded at a starting temperature of 110° C. for 1.5 minutes, then 25 parts of silica (made by Rhodia, product name "Zeosil 1115MP"), 3 parts of zinc oxide, 2 parts of stearic acid, and 2 parts of the antiaging agent N-phenyl-N'-(1,3-dimethylbutyl)-p-phenylene diamine (made by Ouchi Shinko Chemical Industrial, product name "Nocrac 6C") were added and the mixture further kneaded for 2.5 minutes, then the kneaded material was discharged from the mixer. The temperature of the kneaded material after the end of kneading was 150° C. The kneaded material was cooled down to room temperature, then was again kneaded in a Brabender mixer at a starting temperature of 110° C. for 2 minutes, then the kneaded material was discharged from the mixer. Next, using open rolls at 50° C., to the obtained kneaded material, 1.40 parts of sulfur, 1.2 parts of the cross-linking accelerator N-tert-butyl-2-benzothiazolesulfenamide (product name "Noccelar NS-P", made by Ouchi Shinko Chemical Industrial), and 1.2 parts of diphenylguanidine (product name "Noccelar D", made by Ouchi Shinko Chemical Industrial) were added. These were kneaded, then a sheet-shaped rubber composition was taken out. This rubber composition was pressed to cross-link it at 160° C. for 20 minutes to prepare a test piece of cross-linked rubber and this test piece was evaluated for low heat buildup and wet grip. The conjugated diene polymers of Examples 2 to 9 and Comparative Example 1 and Comparative Example 2 were respectively similarly processed to prepare test pieces of cross-linked rubber and these test pieces were evaluated for low heat buildup and wet grip. Table 1 shows these results together.

TABLE 1
| | Coupling agent | Modifying agent | Low heat buildup (index) | Wet grip (index) |
|---|---|---|---|---|
| Example 1 | None | 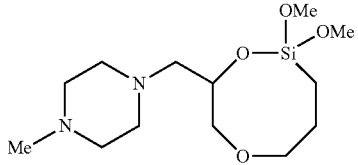 [SMILES: CO[Si]1(OC)CCCOCC(CN2CCN(C)CC2)O1] | 88 | 121 |
| Example 2 | Tin tetrachloride | 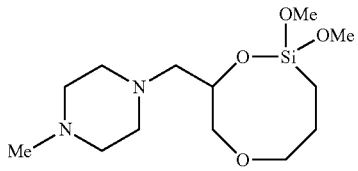 [SMILES: CO[Si]1(OC)CCCOCC(CN2CCN(C)CC2)O1] | 90 | 119 |
| Example 3 | Silicon tetrachloride | 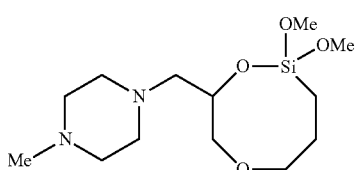 | 90 | 120 |
| Example 4 | 1,6-bis (trichlorosilyl) hexane | 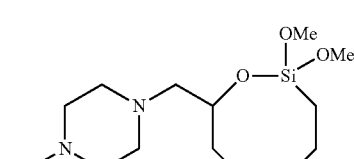 | 90 | 120 |
| Example 5 | 1,2-bis (trichlorosilyl) ethane | 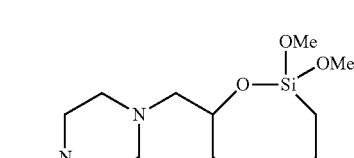 | 91 | 121 |
| Example 6 | None | 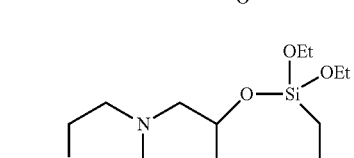 | 84 | 124 |
| Example 7 | Tin tetrachloride | 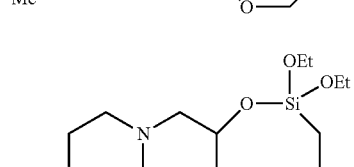 | 87 | 120 |
| Example 8 | None | 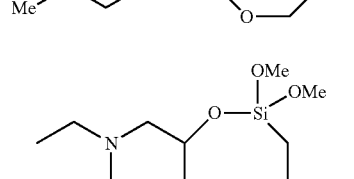 | 96 | 109 |

TABLE 1-continued

| | Coupling agent | Modifying agent | Low heat buildup (index) | Wet grip (index) |
|---|---|---|---|---|
| Example 9 | Tin tetrachloride | 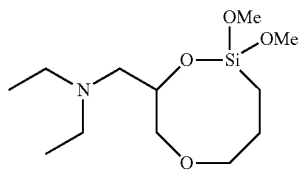 [SMILES: CCN(CC)CC1COCCC[Si](OC)(OC)O1] | 98 | 105 |
| Comparative Example 1 | None | 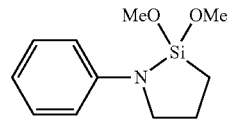 [SMILES: CO[Si]1(OC)CCCN1c1ccccc1] | 100 | 100 |
| Comparative Example 2 | None | 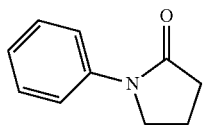 [SMILES: O=C1CCCN1c1ccccc1] | 188 | 102 |

As will be understood from Table 1, the cross-linked rubber obtained using the conjugated diene polyme of the present invention (Examples 1 to 9) obtained by the method of production of the conjugated diene polymer of the present invention are superior to cross-linked rubber obtained using conjugated diene polymer end modified by a conventional technique (Comparative Example 1 and Comparative Example 2) in low heat buildup and wet grip.

The invention claimed is:

1. A composition comprising a conjugated diene polymer represented by the following formula (1) or the following formula (2):

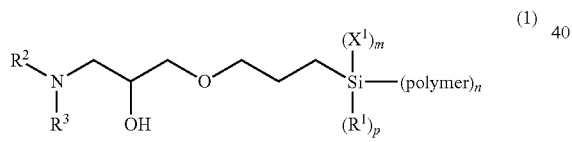
(1)

wherein, in the formula (1), the "polymer" represents a polymer chain containing conjugated diene monomer units, $X^1$ represents a functional group selected from a hydrocarbyloxy group, halogen group, and hydroxyl group, $R^1$ represents a substituted or unsubstituted hydrocarbon group, $R^2$ and $R^3$ respectively represent a substituted or unsubstituted hydrocarbon group, $R^2$ and $R^3$ may bond with each other to form a ring structure, "n" is an integer of 1 to 3, "m" is an integer of 0 to 2, "p" is an integer of 0 to 2, and n+m+p=3,

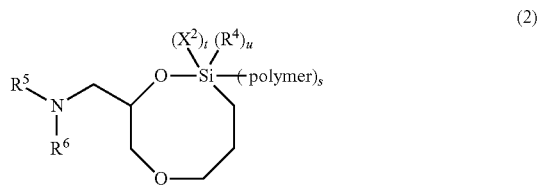
(2)

wherein, in the formula (2), the "polymer" represents a polymer chain containing conjugated diene monomer units, $X^2$ represents a functional group selected from a hydrocarbyloxy group, halogen group, and hydroxyl group, $R^4$ represents a substituted or unsubstituted hydrocarbon group, $R^5$ and $R^6$ respectively represent a substituted or unsubstituted hydrocarbon group, $R^5$ and $R^6$ may bond with each other to form a ring structure, "s" is 1 or 2, "t" is 0 or 1, "u" is 0 or 1, and s+t+u=2.

2. The composition according to claim 1, further comprising a conjugated diene polymer represented by the formula (3) and/or a conjugated diene polymer represented by the formula (4):

(3)

wherein, in the formula (3), "polymer" represents a polymer chain containing conjugated diene monomer units, $X^3$ represents a halogen group or hydroxyl group, M represents a silicon atom or tin atom, "a" is an integer of 1 to 4, "b" is an integer of 0 to 3, and a+b=4,

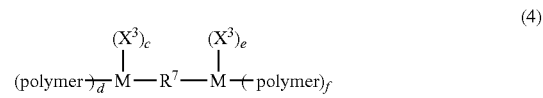
(4)

wherein, in the formula (4), "polymer" represents a polymer chain containing conjugated diene monomer units, $X^3$ represents a halogen group or hydroxyl group, $R^7$ represents a substituted or unsubstituted hydrocarbon group, M represents a silicon atom or tin atom, "c" is an integer of 0 to 3, "d" is an integer of 0 to 3, "e" is an integer of 0 to 3, "f" is an integer of 0 to 3, c+d=3, e+f=3, and d+f is an integer of 1 to 6.

3. A rubber composition comprising 100 parts by weight of a rubber ingredient containing the composition of claim 1, and 10 to 200 parts by weight of silica.

4. A rubber composition comprising 100 parts by weight of a rubber ingredient containing the composition of claim 2, and 10 to 200 parts by weight of silica.

5. The rubber composition according to claim 3 further comprising a cross-linking agent.

6. The rubber composition according to claim 4 further comprising a cross-linking agent.

7. A cross-linked rubber obtained by cross-linking the rubber composition according to claim 5.

8. A cross-linked rubber obtained by cross-linking the rubber composition according to claim 6.

9. A tire comprising the cross-linked rubber according to claim 7.

10. A tire comprising the cross-linked rubber according to claim 8.

11. A method of production of a composition comprising a conjugated diene polymer, the method comprising a step of polymerizing a monomer containing a conjugated diene compound in an inert solvent using a polymerization initiator so as to obtain a conjugated diene polymer chain having an active end and a step of reacting a compound represented by the following formula (5) with the active end of the conjugated diene polymer chain having an active end:

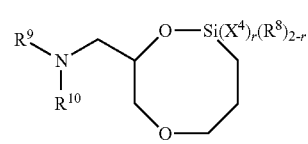

(5)

wherein, in the formula (5), $X^4$ represents a functional group selected from a hydrocarbyloxy group, halogen group, and hydroxyl group, $R^8$ represents a substituted or unsubstituted hydrocarbon group, $R^9$ and $R^{10}$ respectively represent a substituted or unsubstituted hydrocarbon group, $R^9$ and $R^{10}$ may bond with each other to form a ring structure, and "r" is an integer of 0 to 2.

12. The method according to claim 11 further comprising, after obtaining the conjugated diene polymer chain having an active end, a step of reacting part of the active ends of the conjugated diene polymer chains with a tin halide, silicon halide, or compound represented by the following formula (6):

(6)

wherein, in the formula (6), $R^{11}$ represents a substituted or unsubstituted alkyl chain, $X^5$ expresses a halogen group, and M expresses a silicon atom or tin atom.

* * * * *